United States Patent
Hsia et al.

(10) Patent No.: US 7,859,863 B2
(45) Date of Patent: Dec. 28, 2010

(54) SINGLE-STAGE POWER FACTOR CORRECTION CIRCUIT

(75) Inventors: Tsun-Hsiao Hsia, Taipei Hsien (TW); Chung-Ping Ku, Taipei Hsien (TW)

(73) Assignee: Chicony Power Technology Co., Ltd., Taipei Hsien (TW)

( * ) Notice: Subject to any disclaimer, the term of this patent is extended or adjusted under 35 U.S.C. 154(b) by 259 days.

(21) Appl. No.: 12/248,324

(22) Filed: Oct. 9, 2008

(65) Prior Publication Data

US 2009/0091961 A1    Apr. 9, 2009

(30) Foreign Application Priority Data

Oct. 9, 2007    (TW) ............... 96216879 U

(51) Int. Cl.
*H02M 3/335*    (2006.01)
*G05F 1/70*    (2006.01)

(52) U.S. Cl. ............... 363/21.12; 363/126; 323/207

(58) Field of Classification Search ............... 363/16, 363/20, 21.12, 97, 126, 131; 323/205, 207
See application file for complete search history.

(56) References Cited

U.S. PATENT DOCUMENTS

| 6,639,813 | B2 * | 10/2003 | Yamagishi et al. | ....... 363/21.12 |
| 6,661,684 | B2 * | 12/2003 | Morita | ............... 363/89 |
| 6,950,319 | B2 * | 9/2005 | Huber et al. | ............ 363/21.12 |
| 7,280,374 | B1 * | 10/2007 | Huang | ............... 363/16 |

* cited by examiner

*Primary Examiner*—Gary L Laxton
(74) *Attorney, Agent, or Firm*—Muncy, Geissler, Olds & Lowe, PLLC

(57) ABSTRACT

A single-stage power factor correction circuit includes a first rectifier, a second rectifier, a full bridge rectifier, a capacitor, a fly back transformer, and a switch. Unlike conventional single-stage power factor correction circuits, the present invention just needs to pass through two rectifiers at positive and negative half cycles, so as to reduce the conduction loss, lower the temperature of the power supply, and control the voltage of the control energy storage capacitor, and stabilize voltage output.

18 Claims, 5 Drawing Sheets

SINGLE-STAGE POWER FACTOR CORRECTION CIRCUIT

BACKGROUND OF THE INVENTION

1. Field of the Invention

The present invention relates generally to a correction circuit and more particularly, to a single-stage power factor correction circuit that comes with a switch for facilitating positive and negative half cycles to provide a conducting path, so that the current just needs to pass through two rectifiers to lower the temperature of the power supply.

2. Description of the Related Art

A single-stage power factor correction circuit is usually used in a high-performance power supply for improving power factor. In conventional single-stage power factor correction circuits, a loop is formed by passing current through three rectifiers at a positive half cycle or a negative half cycle by means of the ON and OFF of a metal oxide field effect transistor (MOFET).

However, the aforesaid conventional single-stage power factor correction circuit has the drawback that the current has to pass through three rectifiers to form a loop regardless at a positive half cycle or at a negative half cycle, and thus causing a higher conduction loss and increasing the temperature of the power supply.

In view of the aforesaid problem, the present invention filed a utility model to Intelligent Patent Office of Ministry of Economic Affairs. Republic of China on May 9, 2006, entitled "Single-stage power factor correction circuit" (Patent number M301459, equivalent to U.S. application Ser. No. 11/493,879, now allowed). This invention is functional, however it is still not perfect in reduction of the number of component parts and lowering of heat due to current stress.

SUMMARY OF THE INVENTION

The present invention has been accomplished under the circumstances in view. It is a primary objective of the present invention to provide a single-stage power factor correction circuit that allows effective control of the voltage of the energy storage capacitor to lower the manufacturing cost.

It is another objective of the present invention is to provide a single-stage power factor correction circuit that saves one power diode.

It is still another objective of the present invention is to provide a single-stage power factor correction circuit that does not require an extra conduction ratio constraint circuit.

It is still another objective of the present invention is to provide a single-stage power factor correction circuit that has the power diode to work at one half of the input cycle, thereby reducing heat upon current stress.

To achieve these and other objectives and according to one embodiment of the present invention, the single-stage power factor correction circuit comprises a first rectifier, a second rectifier, a full-bridge rectifier, a capacitor, a transformer, and a switch. The first rectifier has a first end. coupled to a line input terminal and a second end. The second rectifier has a first end coupled to a neutral input terminal and a second end coupled to the second end of the first rectifier. The full bridge rectifier comprises a third rectifier, a fourth rectifier, a fifth rectifier and a sixth rectifier. The third rectifier has the positive electrode thereof coupled to the line input terminal. The fourth rectifier has the negative electrode thereof coupled to the line input terminal. The fifth rectifier has the positive terminal thereof coupled to the neutral input terminal. The sixth rectifier has the negative terminal thereof coupled to the neutral input terminal. The capacitor has a first terminal coupled to the second end of the second rectifier, and a second end coupled to the positive electrode of the fourth rectifier and the positive electrode of the sixth rectifier. The transformer comprises a first primary coil, a second primary coil and a first secondary coil. The first primary coil has one end coupled to the other end of the capacitor. The second primary coil has one end coupled to the negative electrode of the third rectifier and the negative electrode of the fifth rectifier. The switch is a three-terminal component having a first terminal coupled an opposite end of the first primary coil and an opposite end of the second primary coil, a second terminal coupled to a control signal, and a third terminal coupled to the capacitor, for receiving the control signal to turn on or off a circuit.

To achieve these and other objectives and according to a second embodiment of the present invention, the single-stage power factor correction circuit comprises a first rectifier, a second rectifier, a full-bridge rectifier, a capacitor, a transformer, and a switch. The first rectifier has a first end coupled to a line input terminal, and a second end. The second rectifier has a first end coupled to a neutral input terminal, and a second end coupled to the second end of the first rectifier. The full bridge rectifier comprises a third rectifier, a fourth rectifier, a fifth rectifier, and a sixth rectifier. The third rectifier has the positive electrode thereof coupled to the line input terminal. The fourth rectifier has the negative electrode thereof coupled to the line input terminal. The fifth rectifier has the positive terminal thereof coupled to the neutral input terminal. The sixth rectifier has the negative terminal thereof coupled to the neutral input terminal. The capacitor has a first terminal coupled to the negative electrodes of the third rectifier and the fifth rectifier, and a second end coupled to the positive electrodes of the fourth rectifier and the sixth rectifier. The transformer comprises a first primary coil, a second primary coil and a first secondary coil. The first primary coil has one end coupled to the capacitor. The second primary coil has one end coupled to the negative electrode of the first rectifier and the negative electrode of the second rectifier. The switch is a three-terminal component having a first terminal coupled an opposite end of the first primary coil and an opposite end of the second primary coil, a second terminal coupled to a control signal, and a third terminal coupled to the capacitor, for receiving the control signal to turn on or off a circuit.

DETAILED DESCRIPTION OF THE INVENTION

Figure 1:
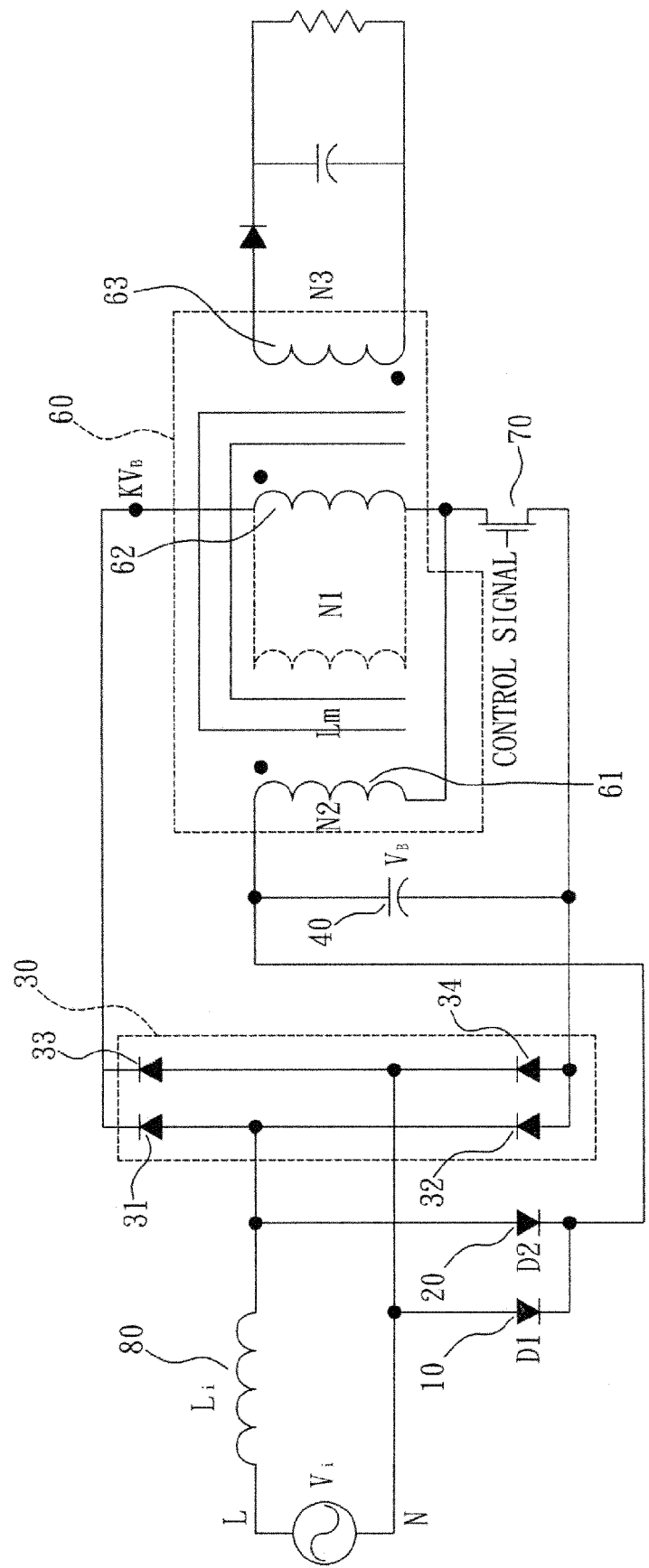
FIG. 1 is a schematic block diagram showing a single-stage power factor correction circuit according to the present invention.

Referring to FIG. 1, a single-stage power factor correction circuit according to a preferred embodiment of the present invention, the single-stage power factor correction circuit comprises a first rectifier 10, a second rectifier 20, a full bridge rectifier 30, a capacitor 40, a transformer 60 and a switch 70.

The first rectifier 10 is comprised of but not limited to a rectifier diode, having its end coupled to a neutral input terminal (N) for providing a half wave rectification effect, but it relates to a prior art power supply and thus will not be described here.

The second rectifier 20 is comprised of but not limited to a rectifier diode, having its one end coupled to a neutral input terminal (N) for providing a half wave rectification effect, but it is related to a prior art power supply, and thus will not be described here.

The full bridge rectifier 30 comprises a third rectifier 31, a fourth rectifier 32, a fifth rectifier 33 and a sixth rectifier 34, wherein the positive electrode of the third rectifier 31 and the negative electrode of the fourth rectifier 32 are coupled to the line input terminal L, and the positive electrode of the fifth rectifier 33 and the negative electrode of the sixth rectifier 34 are coupled to the neutral input terminal, but it is related to a prior art power supply, and thus will not be described here.

The capacitor 40 has its one end coupled to the second end (negative electrodes) of the first rectifier 10 and the second end (negative electrodes) of the second rectifier 20, and its another end coupled to the positive electrode of the fourth rectifier 32 and the positive electrode of the sixth rectifier 34. Further, the capacitor 40 has a voltage $V_B$.

The transformer 60 is comprised of but not limited to a fly back transformer, comprising a first primary coil 61, a second primary coil 62 and a first secondary coil 63, wherein an end of the first primary coil 61 is coupled to the capacitor 40; one end of the second primary coil 62 is coupled to the negative electrode of the third rectifier 31 and the negative electrode of the fifth rectifier 33. Further, the first primary coil 61 has N2 coils and the second primary coil 62 has N1 coils, such that the voltage at the position where the negative electrode of the third rectifier 31 and the negative electrode of the fifth rectifier 33 are coupled to the second primary coil 62 has a voltage $KV_B$, and K=N1/N2, and $V_B$ is the voltage between both ends of the capacitor 40.

The switch 70 is a three-terminal component which is any electric power switch including but not limited to a N-channel metal oxide field effect transistor (MOFET), a N-channel junction field effect transistor (JFET), a P-channel metal oxide field effect transistor (MOFET) or a P-channel junction field effect transistor (JFET), which are hereinafter referred to as a MOS switch 70, and the first terminal of the switch 70 is coupled to the other end of the first primary coil 61 and the other end of the second primary coil 62, and the second terminal of the switch 70 is coupled to a control signal, and the third terminal of the switch 70 is coupled to another end of the capacitor 40, for receiving the control signal for turning on or off a circuit. The second terminal is a gate of the metal oxide field effect transistor (MOFET) 70 and the first terminal is a drain of the metal oxide field effect transistor (MOFET) 70, and the third terminal is a source of the metal oxide field effect transistor (MOFET) 70, wherein the control signal is outputted by an external power factor correction controller (not shown in the figure).

Figure 2:
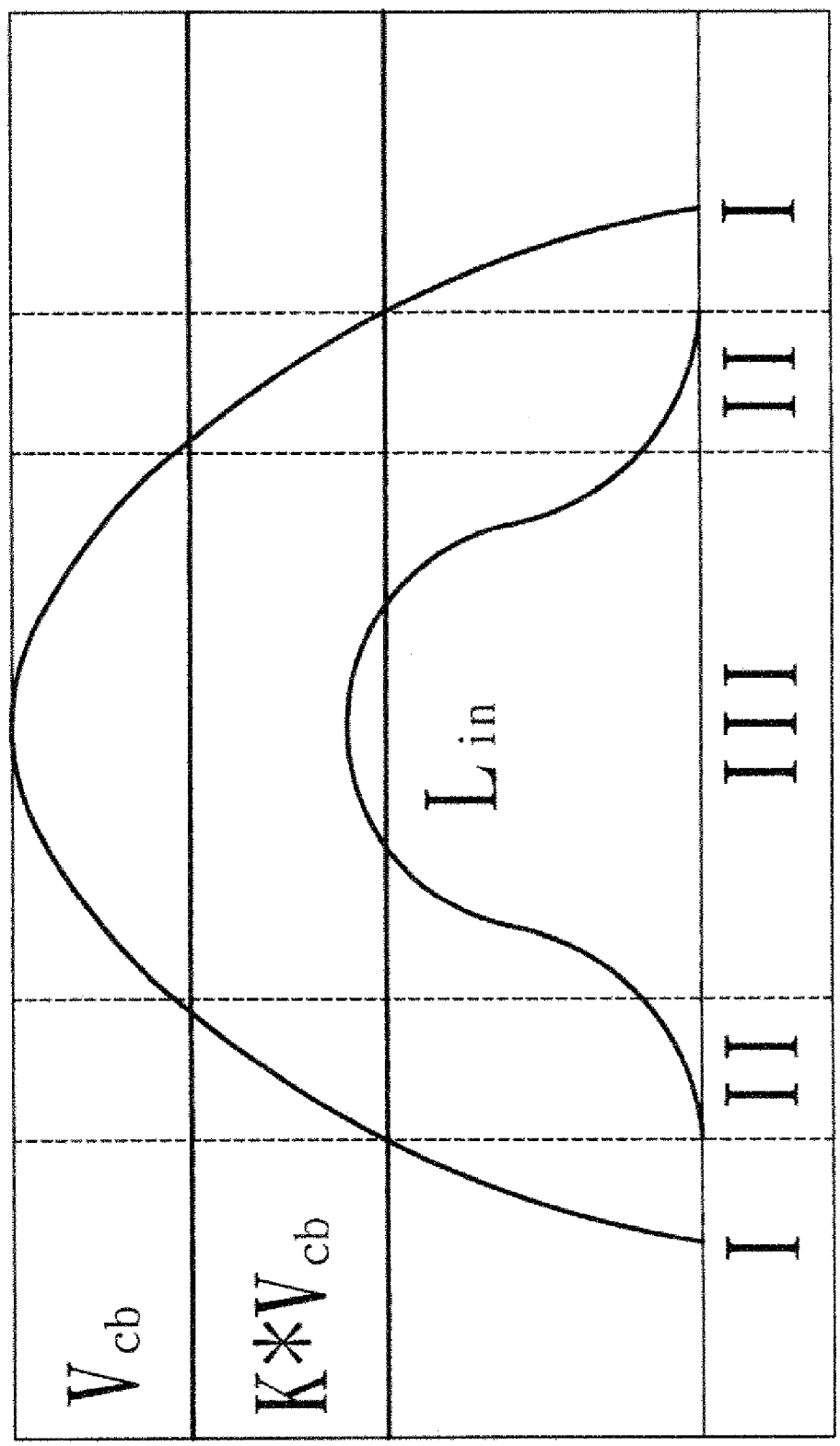
FIG. 2 is a schematic drawing showing an action of the single-stage power factor correction circuit upon input voltage V<voltage $KV_B$>voltage $V_B$.

FIG. 2 is a schematic drawing showing an action of the single-stage power factor correction circuit upon input voltage V<voltage $KV_B$>voltage $V_B$.

As illustrated, during the operation, both ends of the first rectifier 10 are reverse bias if the input voltage $V_i$ is less than the voltage $KV_B$, and thus the second rectifier 20 is situated at a cutoff state and the circuit discharges $V_B$ to the circuits at the secondary side, and therefore the current $I_{in}$ at the input terminal is zero.

As illustrated, both ends of the third rectifier 31 are forward bias, if the input voltage $V_i$ is greater than the voltage $KV_B$, and thus the third rectifier 31 is situated at a conducting state, and both ends of the second rectifier 20 are still reverse bias. By then, $V_i$ and $V_B$ supply electric power to the circuit, $I_{in}$ is not zero, however its current value is small because it is at the initial conduction stage.

As illustrated, both ends of the second rectifier 20 are forward bias, if the input voltage $V_i$ is greater than the voltage $V_B$, and thus the second rectifier 20 is situated at a conducting state, and both ends of the third rectifier 31 are also forward bias. By then, $V_i$ supplies electric power to the circuit. When approaching the voltage peak value $V_{PK}$, $V_i$ directly provides electric power, and the current value of $V_i$ is close to the peak value. When over the peak value $V_P$, input voltage $V_i$ is reducing, thus returning to the aforesaid stage, and one positive half cycle is completed.

Therefore, the single-stage power factor correction circuit saves a rectifier at the input terminal of the capacitor 40, and lowers the voltage $V_B$ at the two ends of the capacitor 40, thereby reducing the cost of component parts.

Figure 3A:
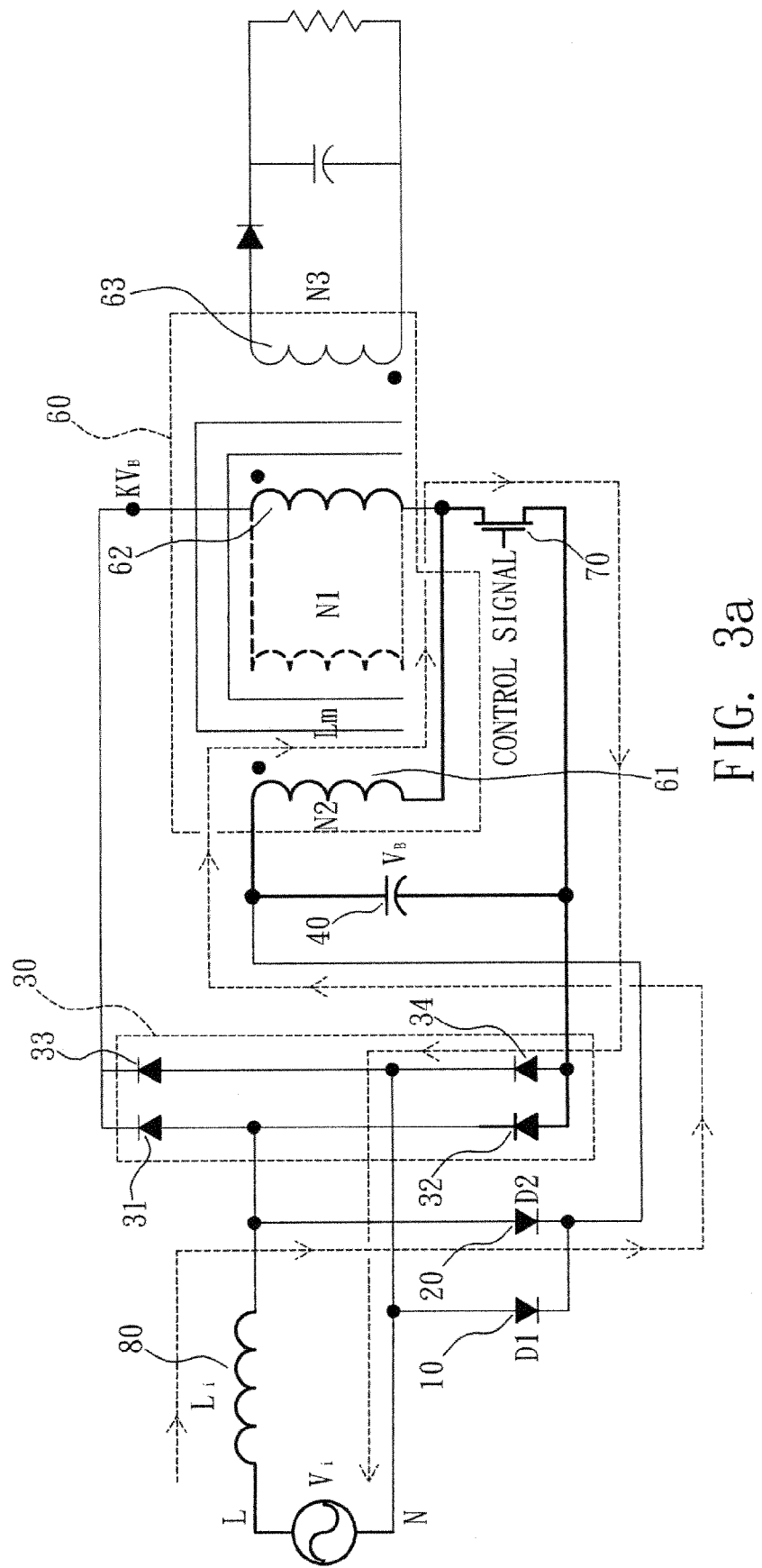
FIG. 3(a) is a schematic view of a current flow of a single-stage power factor correction circuit at a positive half cycle according to the present invention.

Referring to FIG. 3(a) for a schematic view of a current flow of a single-stage power factor correction circuit at a positive half cycle according to the present invention, the switch 70 is electrically conducted by the control of the control signal, if $V_i$ supplies electric power at a positive half cycle, so that the current flows from the line input terminal (L) through the second rectifier 20, the switch 70 and the sixth rectifier 34 to the neutral input terminal (N) to form a current loop; and then the control signal turns off the switch 70, so that the current flows from the line input terminal (L) through the third rectifier 31 and the sixth rectifier 34 to the neutral input terminal (N) to form a current loop.

Figure 3B:
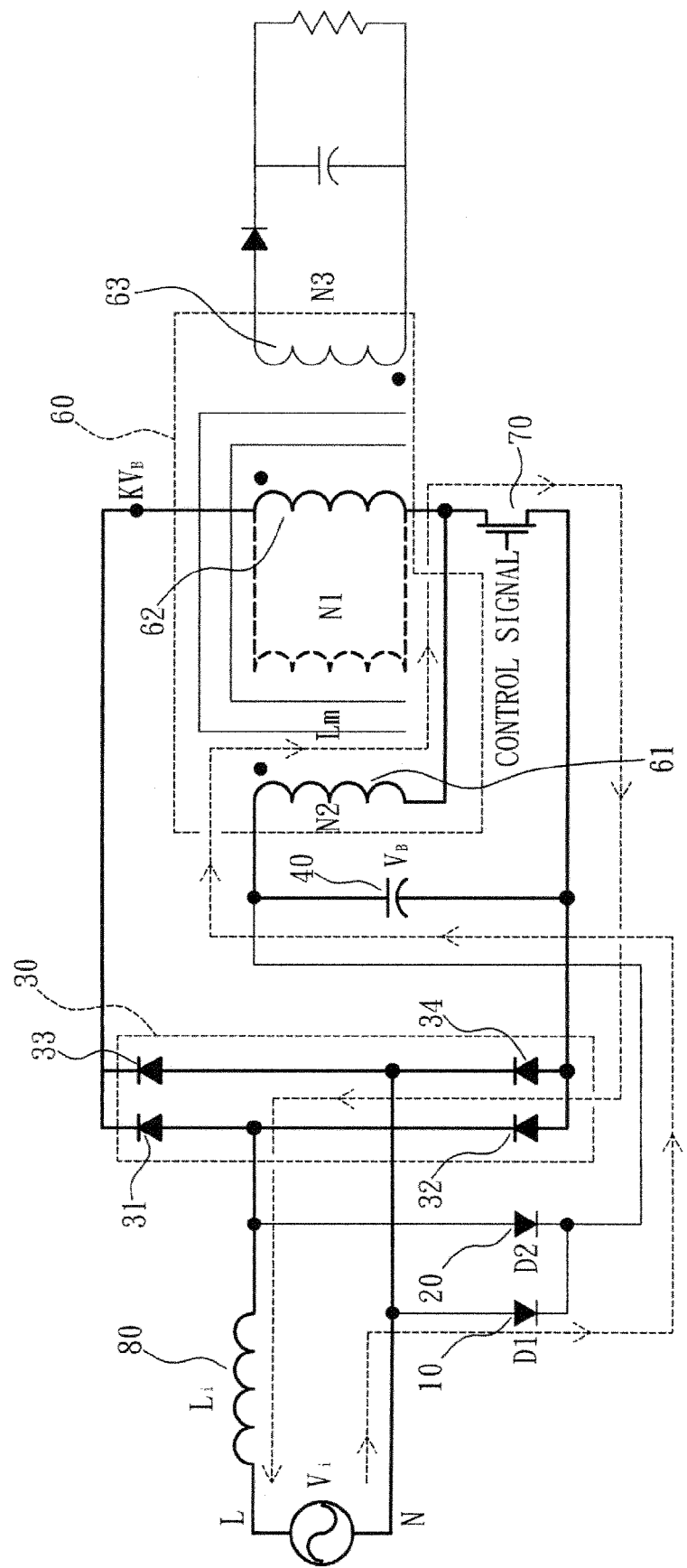
FIG. 3(b) is a schematic view of a current flow of a single-stage power factor correction circuit at a negative half cycle according to the present invention.

Referring to FIG. 3(b) for a schematic view of a current flow of a single-stage power factor correction circuit at a negative half cycle according to the present invention, the switch 70 is electrically conducted by the control of the control signal at a negative half cycle, so that the current flows from the neutral input terminal (N) through the first rectifier 10, the switch 70 and the fourth rectifier 32 to the line input terminal (L) to form a current loop; and then the control signal turns off the switch 70, so that the current flows from the neutral input terminal (N) through the fifth rectifier 33 and the fourth rectifier 32 to the line input terminal (L) to form a current loop.

Therefore, the current just needs to pass through two rectifiers regardless of being situated at a positive half cycle or a negative half cycle in accordance with the single-stage power factor correction circuit of the invention, and thus the present invention can provide a lower conduction loss and reduce the temperature of the power supply. The single-stage power factor correction circuit of the invention definitely improves the drawbacks of the conventional single-stage power factor correction circuits.

In addition, the single-stage power factor correction circuit of the invention further comprises an inductor 80 connected in series between the line input terminal (L) and the second rectifier 20 for storing electric energy and supplying electric power to the capacitor 40 at the same time, so as to slow down the change of the input current.

Figure 4:
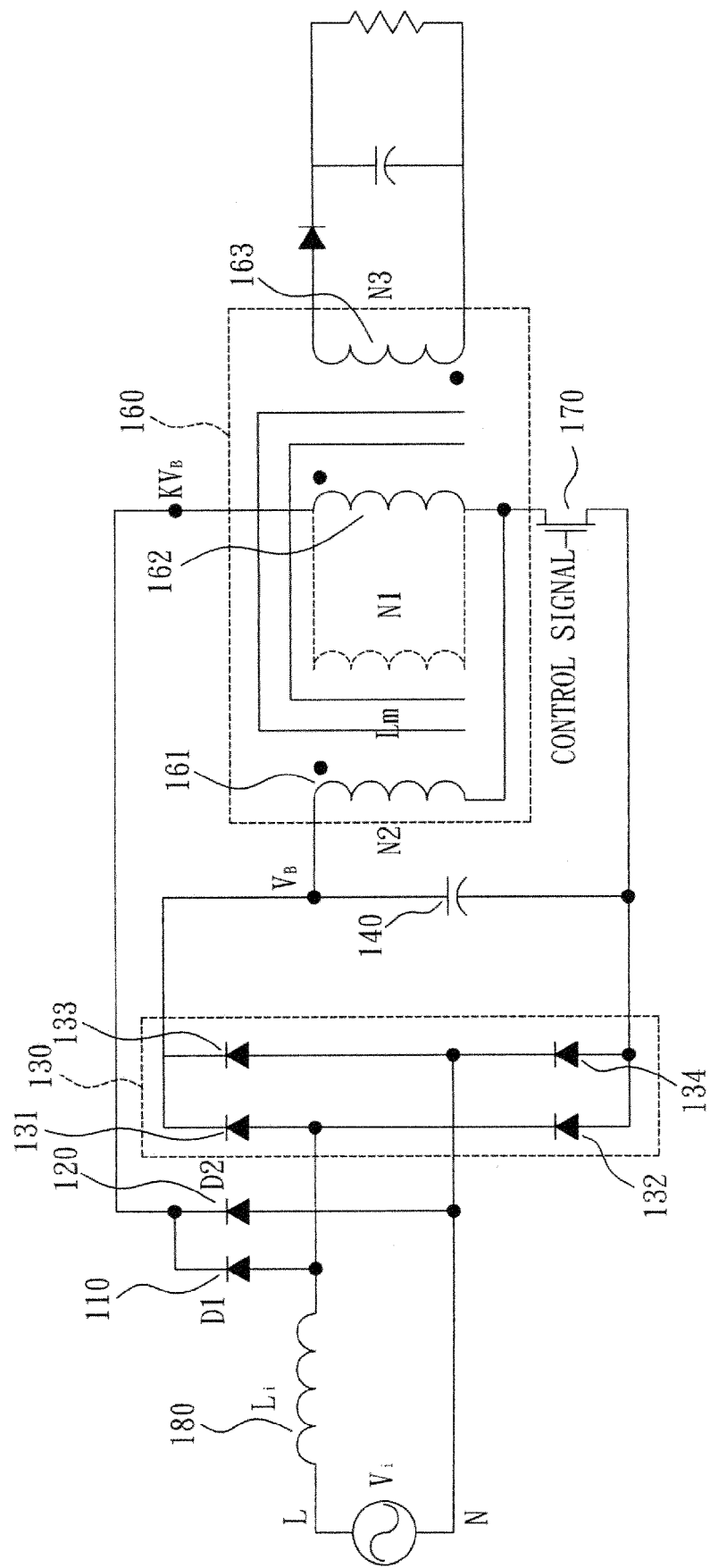
FIG. 4 is a schematic block diagram showing an alternate form of the single-stage power factor correction circuit, according to the present invention.

FIG. 4 illustrates an alternate form of the single-stage power factor correction circuit according to the present invention. As illustrated, the single-stage power factor correction circuit is comprised of a first rectifier 110, a second rectifier 120, a full bridge rectifier 130, a capacitor 140, a transformer 160 and a switch 170.

The first rectifier 110 is comprised of but not limited to a rectifier diode, having its end coupled to a line input terminal (L) for providing a half wave rectification effect, but it relates to a prior art power supply and thus will not be described here.

The second rectifier 120 is comprised of but not limited to a rectifier diode, having its one end coupled to a neutral input terminal (N) for providing a half wave rectification effect, but it is related to a prior art power supply, and thus will not be described here.

The full bridge rectifier 130 comprises a third rectifier 131, a fourth rectifier 132, a fifth rectifier 133 and a sixth rectifier 134, wherein the positive electrode of the third rectifier 131 and the negative electrode of the fourth rectifier 132 are coupled to the line input terminal (L), and the positive electrode of the fifth rectifier 133 and the negative electrode of the sixth rectifier 134 are coupled to the neutral input terminal (N), but it is related to a prior art power supply, and thus will not be described here.

The capacitor 140 has its one end coupled to the second end (negative electrodes) of the third rectifier 131 and the second end (negative electrodes) of the fifth rectifier 133, and its another end coupled to the positive electrode of the fourth rectifier 132 and the positive electrode of the sixth rectifier 134. Further, the capacitor 140 has a voltage $V_B$.

The transformer 160 is comprised of but not limited to a fly back transformer, comprising a first primary coil 161, a second primary coil 162 and a first secondary coil 163, wherein an end of the first primary coil 161 is coupled to the capacitor 140; one end of the second primary coil 162 is coupled to the negative electrode of the first rectifier 110 and the negative electrode of the second rectifier 120. Further, the first primary coil 161 has N2 coils and the second primary coil 162 has N1 coils, such that the voltage at the position where the negative electrode of the first rectifier 110 and the negative electrode of the second rectifier 120 are coupled to the second primary coil 162 has a voltage $KV_B$, and K=N1/N2, and $V_B$ is the voltage between both ends of the capacitor 140.

The switch 170 is a three-terminal component which is any electric power switch including but not limited to a N-channel metal oxide field effect transistor (MOFET), a N-channel junction field effect transistor (JFET), a P-channel metal oxide field effect transistor (MOFET) or a P-channel junction field effect transistor (JFET), which are hereinafter referred to as a MOS switch 170, and the first terminal of the switch 170 is coupled to the other end of the first primary coil 161 and the other end of the second primary coil 162, and the second terminal of the switch 170 is coupled to a control signal, and the third terminal of the switch 170 is coupled to another end of the capacitor 140, for receiving the control signal for turning on or off a circuit. The second terminal is a gate of the metal oxide field effect transistor (MOFET) 170 and the first terminal is a drain of the metal oxide field effect transistor (MOFET) 170, and the third terminal is a source of the metal oxide field effect transistor (MOFET) 170, wherein the control signal is outputted by an external power factor correction controller (not shown in the figure).

During the positive half cycle, the switch 170 is turned on, and the current flows through the first rectifier 110 and the sixth rectifier 134, and then the switch 170 is turned off so that the current flows through the third rectifier 131 and the sixth rectifier 134. During the negative half cycle, the switch 170 is turned on, and the current flows through the second rectifier 120 and the fourth rectifier 132, and then the switch 170 is turned off so that the current flows through the fifth rectifier 133 and the fourth rectifier 132. Thus, the single-stage power factor correction circuit of this second embodiment achieves the same effects as the aforesaid first embodiment of the present invention.

In addition, the single-stage power factor correction circuit of this second embodiment further comprises an inductor 180 connected in series between the line input terminal (L) and the first rectifier 110 for storing electric energy and supplying electric power to the capacitor 140 at the same time, so as to slow down the change of the input current.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A single-stage power factor correction circuit, comprising:
   a first rectifier, said first rectifier having a first end coupled to a line input terminal and a second end;
   a second rectifier, said second rectifier having a first end coupled to a neutral input terminal and a second end coupled to the second end of said first rectifier;
   a full bridge rectifier, said full bridge rectifier comprising a third rectifier, a fourth rectifier, a fifth rectifier and a sixth rectifier, said third rectifier and said fourth rectifier and said fifth rectifier and said sixth rectifier each having a positive electrode at one end and a negative electrode at an opposite end, said third rectifier having the positive electrode thereof coupled to said line input terminal, said fourth rectifier having the negative electrode thereof coupled to said line input terminal, said fifth rectifier having the positive terminal thereof coupled to said neutral input terminal, said sixth rectifier having the negative terminal thereof coupled to said neutral input terminal;
   a capacitor, said capacitor having a first terminal coupled to the second end of said second rectifier and a second end coupled to the positive electrode of said fourth rectifier and the positive electrode of said sixth rectifier;
   a transformer, said transformer comprising a first primary coil, a second primary coil and a first secondary coil, said first primary coil having one end coupled to said capacitor, said second primary coil having one end coupled to the negative electrode of said third rectifier and the negative electrode of said fifth rectifier; and
   a switch, said switch being a three-terminal component having a first terminal coupled an opposite end of said first primary coil and an opposite end of said second primary coil, a second terminal coupled to a control signal, and a third terminal coupled to said capacitor, for receiving said control signal to turn on or off a circuit.

2. The single-stage power factor correction circuit of claim 1, wherein said switch is an electric power switch.

3. The single-stage power factor correction circuit of claim 2, wherein said electric power switch is one of N-channel metal oxide field effect transistor, N-channel junction field effect transistor, P-channel metal oxide field effect transistor, and P-channel junction field effect transistor.

4. The single-stage power factor correction circuit of claim 3, wherein said first terminal is a drain of said metal oxide field effect transistor, and said second terminal is a gate of said metal oxide field effect transistor, and said third terminal is a source of said metal oxide field effect transistor.

5. The single-stage power factor correction circuit of claim 1, wherein said first rectifier and said second rectifier are rectifier diodes.

6. The single-stage power factor correction circuit of claim 1, wherein said control signal is outputted by an external power factor correction controller, such that when said control signal is at a positive half cycle, said switch is conducted to allow current to pass through said second rectifier and said sixth rectifier, and then said switch is turned off to allow current to pass through said third rectifier and said sixth rectifier; and when said control signal is at a negative half cycle, said switch is conducted to allow current to pass through said first rectifier and said fourth rectifier, and then said switch is turned off to allow current to pass through said fifth rectifier and said fourth rectifier.

7. The single-stage power factor correction circuit of claim 1, wherein said first primary coil has N2 coils, and said second primary coil has N1 coils, such that a negative electrode of said third rectifier and the negative electrode of said fifth rectifier have a voltage $KV_B$, and $K=N1/N2$, and $V_B$ is the voltage between the two ends of said capacitor.

8. The single-stage power factor correction circuit of claim 1, further comprising an inductor connected in series between said line input terminal and said second rectifier for simultaneously supplying an electric power to said capacitor, so as to slow down the change of current.

9. The single-stage power factor correction circuit of claim 1, wherein said transformer is a fly back transformer.

10. A single-stage power factor correction circuit, comprising:
    a first rectifier, said first rectifier having a first end coupled to a line input terminal and a second end;
    a second rectifier, said second rectifier having a first end coupled to a neutral input terminal and a second end coupled to the second end of said first rectifier;
    a full bridge rectifier, said full bridge rectifier comprising a third rectifier, a fourth rectifier, a fifth rectifier and a sixth rectifier, said third rectifier and said fourth rectifier and said fifth rectifier and said sixth rectifier each having a positive electrode at one end and a negative electrode at an opposite end, said third rectifier having the positive electrode thereof coupled to said line input terminal, said fourth rectifier having the negative electrode thereof coupled to said line input terminal, said fifth rectifier having the positive terminal thereof coupled, to said neutral input terminal, said sixth rectifier having the negative terminal thereof coupled to said neutral input terminal;
    a capacitor, said capacitor having a first terminal coupled to the negative electrodes of said third rectifier and said fifth rectifier and a second end coupled to the positive electrodes of said fourth rectifier and said sixth rectifier;
    a transformer, said transformer comprising a first primary coil, a second primary coil and a first secondary coil, said first primary coil having one end coupled to said capacitor, said second primary coil having one end coupled to the negative electrode of said first rectifier and the negative electrode of said second rectifier; and
    a switch, said switch being a three-terminal component having a first terminal coupled an opposite end of said first primary coil and an opposite end of said second primary coil, a second terminal coupled to a control signal, and a third terminal coupled to said capacitor, for receiving said control signal to turn on or off a circuit.

11. The single-stage power factor correction circuit of claim 10, wherein said switch is an electric power switch.

12. The single-stage power factor correction circuit of claim 11, wherein said electric power switch is one of N-channel metal oxide field effect transistor, N-channel junction field effect transistor, P-channel metal oxide field effect transistor, and P-channel junction field effect transistor.

13. The single-stage power factor correction circuit of claim 12, wherein said first terminal is a drain of said metal oxide field effect transistor, and said second terminal is a gate of said metal oxide field effect transistor, and said third terminal is a source of said metal oxide field effect transistor.

14. The single-stage power factor correction circuit of claim 10, wherein said first rectifier and said second rectifier are rectifier diodes.

15. The single-stage power factor correction circuit of claim 10, wherein said control signal is outputted by an external power factor correction controller, such that when said control signal is at a positive half cycle, said switch is conducted to allow current to pass through said first rectifier and said sixth rectifier, and then said switch is turned off to allow current to pass through said third rectifier and said sixth rectifier; and when said control signal is at a negative half cycle, said switch is conducted to allow current to pass through said second rectifier and said fourth rectifier and then said switch is turned off to allow current to pass through said fifth rectifier and said fourth rectifier.

16. The single-stage power factor correction circuit of claim 10, wherein said first primary coil has N2 coils, and said second primary coil has N1 coils, such that a negative electrode of said third rectifier and the negative electrode of said fifth rectifier have a voltage $KV_B$, and $K=N1/N2$, and $V_B$ is the voltage between the two ends of said capacitor.

17. The single-stage power factor correction circuit of claim 10, further comprising an inductor connected in series between said line input terminal and said first rectifier for simultaneously supplying an electric power to said capacitor, so as to slow down the change of current.

18. The single-stage power factor correction circuit of claim 10, wherein said transformer is a fly back transformer.

* * * * *